United States Patent [19]

Brooks

[11] Patent Number: 4,995,523

[45] Date of Patent: Feb. 26, 1991

[54] TANK CLAMPING MECHANISM

[75] Inventor: Gary L. Brooks, Lake Geneva, Wis.

[73] Assignee: Sta-Rite Industries, Inc., Milwaukee, Wis.

[21] Appl. No.: 530,113

[22] Filed: May 29, 1990

[51] Int. Cl.⁵ .............................................. B65D 45/16
[52] U.S. Cl. .................................... 220/4.12; 220/325; 220/4.21
[58] Field of Search .................. 220/5 A, 5 R, 8, 319, 220/320, 315, 324, 325

[56] References Cited

U.S. PATENT DOCUMENTS

| 502,846 | 8/1893 | Caird . | |
|---|---|---|---|
| 3,275,185 | 9/1966 | Svenson | 220/325 |
| 3,858,751 | 1/1975 | Marvin, Jr. et al. | 220/325 |
| 4,009,798 | 3/1907 | Pechacek | 220/325 |
| 4,054,224 | 10/1977 | Pechacek | 220/325 |
| 4,059,202 | 11/1977 | Jones, Jr. | 220/325 |
| 4,177,934 | 12/1979 | Hammes et al. | 220/319 |
| 4,219,125 | 8/1980 | Wiltshire et al. | 220/5 A |
| 4,223,922 | 9/1980 | Pape | 285/39 |
| 4,267,940 | 5/1981 | Wade | 220/321 |
| 4,660,869 | 4/1987 | Gabus | 285/365 |
| 4,674,650 | 6/1987 | Hamilton et al. | 220/319 |
| 4,699,291 | 10/1987 | Prais et al. | 220/319 |

FOREIGN PATENT DOCUMENTS

| 1259916 | 2/1968 | Fed. Rep. of Germany . |
|---|---|---|
| 3108442 | 2/1968 | Fed. Rep. of Germany . |
| 3248417A1 | 2/1968 | Fed. Rep. of Germany . |
| 597282 | 10/1959 | Italy . |
| 689628 | 4/1953 | United Kingdom . |
| 896695 | 4/1953 | United Kingdom . |

Primary Examiner—Joseph Man-fu Moy
Attorney, Agent, or Firm—Peter N. Jansson, Ltd.

[57] ABSTRACT

An improved tank clamping mechanism includes a first tank shell which has at least one first flange projecting from it. The first flange has a first aperture configured to restrain an abutment member. A second tank shell has a second flange projecting from it which is positioned in general registry with the first flange. The second flange includes a second aperture in general registry with the first aperture and similarly configured to restrain the abutment member. A clamping assembly includes a clamp, an abutment member received in the two apertures and an adjusting means. The clamp is configured to engage the first flange and the second flange and urge the flanges toward clamped engagement with one another as the clamp is urged toward the abutment member by manipulating the adjustment means. The tank shells are thereby clamped together for confining a pressurized medium therewithin.

12 Claims, 3 Drawing Sheets

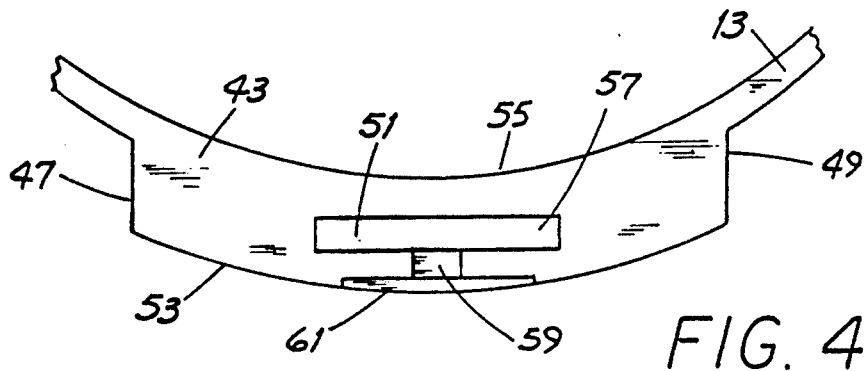
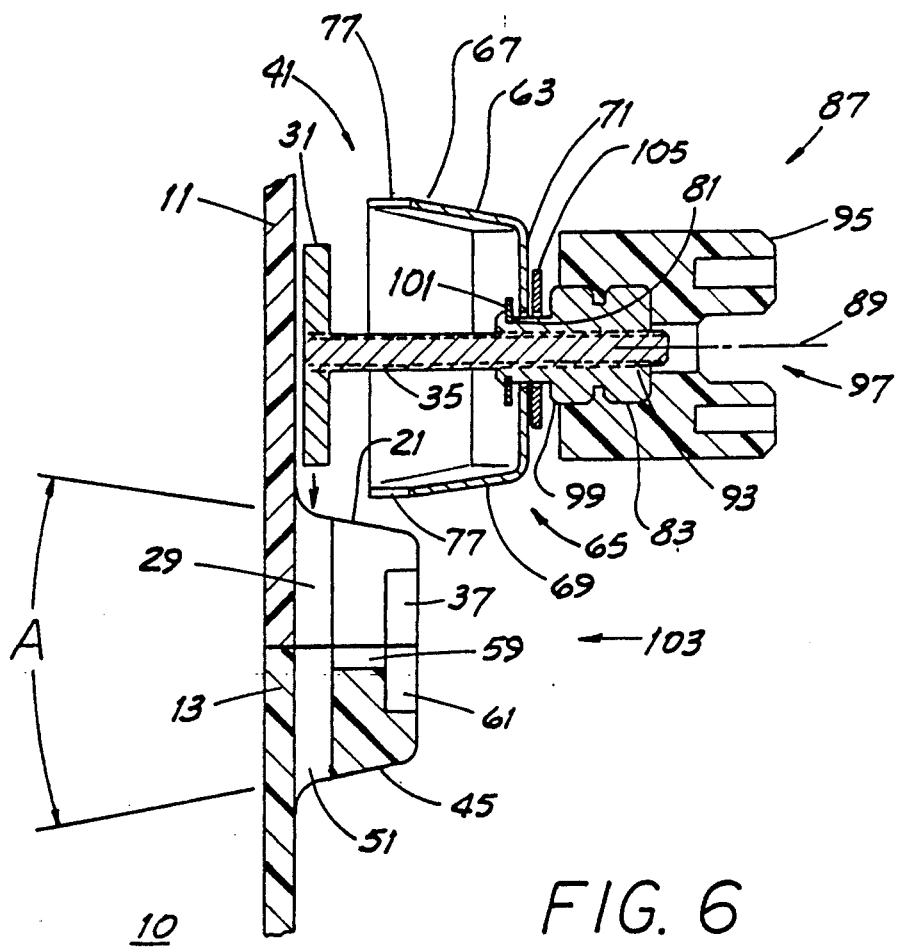

TANK CLAMPING MECHANISM

FIELD OF THE INVENTION

This invention is related generally to clamping mechanisms and, more particularly, to an improved tank clamping mechanism used for clamping hollow tank shells to one another. The mechanism is particularly useful with pressurized filter assemblies.

BACKGROUND OF THE INVENTION

Clamping mechanisms are often used to secure covers to containers or to secure tank halves to one another. Certain of such clamping mechanisms are used for simple attachment tasks. Because significant separating forces are not encountered the related clamping mechanisms require only minimum strength. Other types of clamping mechanisms are required to be quite sturdy, e.g., those which retain shells of pressurized vessels in closely fitted engagement with one another.

One type of known clamping mechanism is used with tank shells or housings, each of which has an annular flange or lip fitted to a similar flange on the companion shell. Such flanges offer a significant area of sealing contact and are maintained in a clamped position by a plurality of bolts received through holes spaced about the flanges. While clamping mechanisms of this type are strong, a very significant amount of time is required to assembly the tank and to remove all bolts to separate the shells in the event such is required for service. If one is required to separate the shells more frequently for service, such as to replace a filter, the described construction becomes even more disadvantageous.

Other types of known clamping mechanisms are shown in German Offenlegungsschrift DE 31 08 442 A1, U.S. Pat. No. 4,674,650, U.K. Patent specification 896,695 and Italian Brevetto per Invenzione 597282. The clamping mechanisms shown in the foregoing documents tend to share certain disadvantages.

Each of them includes a hoop-like band which is conformably fitted to and engaged with the projecting rims of the two container portions or shells to be clamped. Over time, the bands tend to undesirably adhere to such rims. It is not uncommon to encounter a band which must be tapped about its circumference with a mallet in order to loosen it prior to removal. Another disadvantage lies in the fact that such clamping bands are often joined at their ends by a single bolt or other fastener. Inadvertent failure to securely tighten the bolt or inattention to a bolt weakened by rust or corrosion can result in a bolt failure.

Yet a further disadvantage is that some of the clamping mechanisms illustrated in the documents noted above are intended only for joining together a non-pressurized container and its cover, for example. Such mechanisms are poorly or only moderately well suited for clamping together tank shells which confine a pressurized medium within them.

An improved tank clamping mechanism which may be installed and removed quickly and easily, which may be adapted to provide multiple points of clamping force and which is suitable for use with tank shells having a pressurized medium confined therewithin would be an important advance in the art.

OBJECTS OF THE INVENTION

It is an object of this invention to overcome some of the problems and shortcomings of the prior art.

Another object of this invention is to provide an improved tank clamping mechanism for clamping a first tank shell and a second tank shell which confine a pressurized medium therewithin.

Another object of this invention is to provide a tank clamping mechanism useful for providing an independent clamping force at each of several locations on a tank.

Still another object of this invention is to provide an improved tank clamping mechanism which employs protruding flanges and a clamping assembly to engage the flanges and to urge them toward clamped engagement with one another.

Yet another object of this invention is to provide an improved tank clamping mechanism useful with tank shells molded of a plastic material.

Another object of this invention is to provide an improved tank clamping mechanism which may be readily installed and removed by hand or by the use of simple hand tools.

These and other important objects will be apparent from the descriptions of this invention which follow.

SUMMARY OF THE INVENTION

The improved tank clamping mechanism includes a first tank shell which has at least one first flange projecting from it and having a first aperture configured to restrain an abutment member. A second tank shell has a second flange projecting from it and positioned in general registry with the first flange. The second flange includes a second aperture in general registry with the first aperture and similarly configured to restrain the abutment member. A clamping assembly includes a clamp, an abutment member received in the first aperture and the second aperture and an adjusting means. The clamp is configured to engage the first flange and the second flange and urge the flanges toward clamped engagement with one another as the clamp is urged toward the abutment member by manipulating the adjustment means. The tank shells are thereby clamped together for confining a pressurized medium therewithin.

In a highly preferred embodiment, the aperture formed in the first flange is generally T-shaped. The "leg" or lateral slot of this aperture permits a threaded shank to project outward from it and the aperture "cross arm" receives and restrains a portion of a plate-like abutment member attached to the shank.

The aperture in the second flange is in registry with the cross arm portion of that aperture in the companion first flange and similarly receives and restrains another portion of the abutment member. The aperture in the second flange has a locating notch adjacent thereto and when the clamping mechanism is assembled, the shank rests in this notch. The abutment member is thereby positioned within the apertures so that approximately one half of its surface area bears against each of the first and second flanges. Further, the longitudinal center line of the shank is positioned by the locating notch to be generally coincident with the plane defined by the engaged faces of the flanges.

At least one flange, and preferably both flanges, of each flange set includes a generally planar face which is angularly disposed with respect to the aforementioned plane. The clamp is generally U-shaped in cross section and includes a top cover, a bottom cover and a panel joining the covers. The covers diverge from one another and define an included angle therebetween which is generally equal to the included angle defined by the flange faces.

With the shells fitted together and aligned so that the flange or flanges are in registry, the abutment member is inserted into the apertures until the shank rests against the locating notch. The clamp will thereby be aligned to engage and clamp together each flange set. Shells are secured together by tightening the clamping assembly until the clamp fully engages the flange set.

Other details of the invention are set forth below in the detailed description.

BRIEF DESCRIPTION OF THE DRAWINGS

FIG. 4 is a plan view of a second flange taken along the viewing plane 4—4 of FIG. 2 with parts broken away.

FIG. 5 is a perspective view of the components of the clamping assembly.

FIG. 6 is an elevation view of the clamping mechanism taken generally along the viewing plane 6—6 of FIG. 2 except further showing a cross sectional view of the clamping mechanism of FIG. 5 and positioned for installation on a flange set.

DETAILED DESCRIPTION OF PREFERRED EMBODIMENTS

Figure 1:
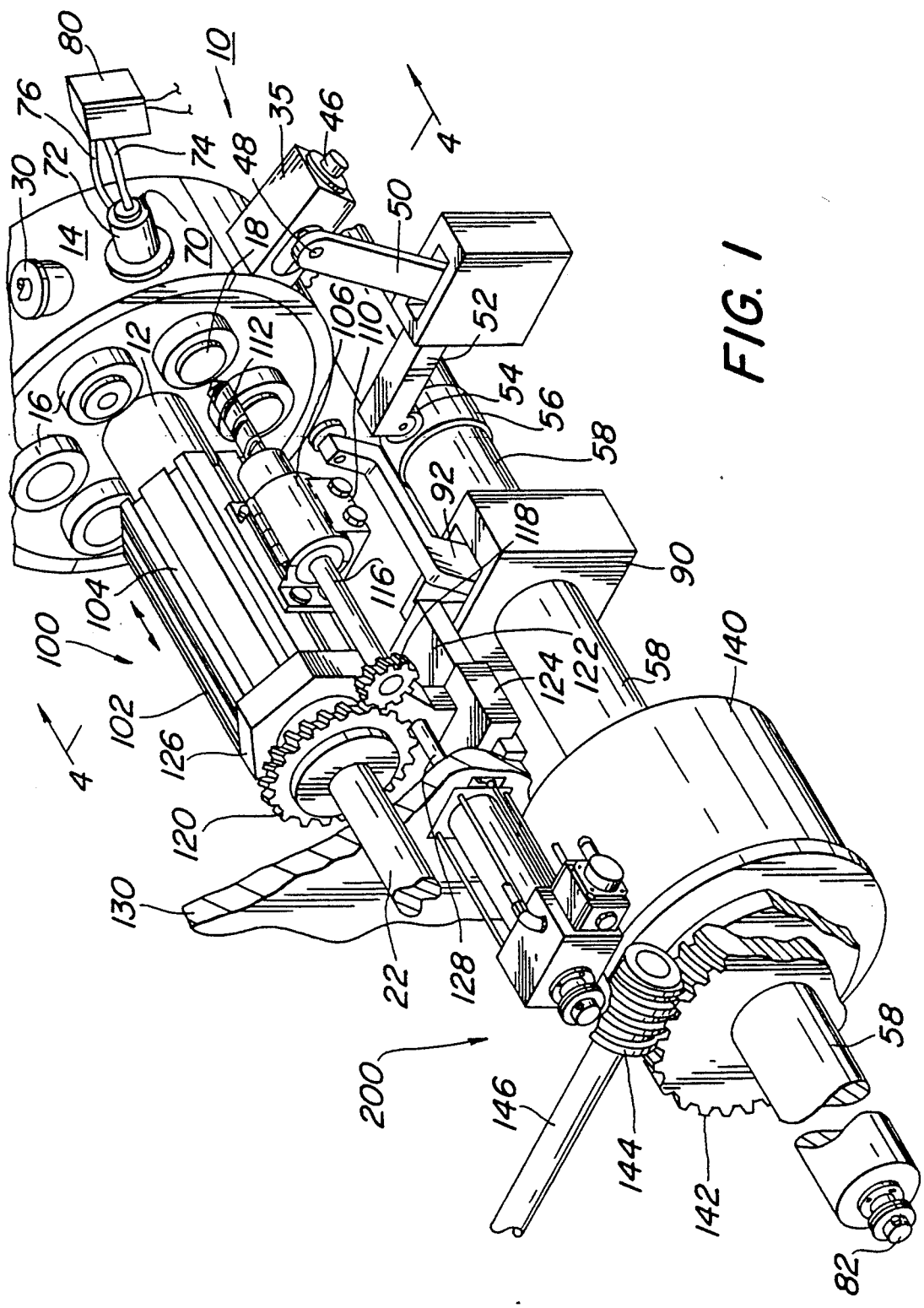
FIG. 1 is a perspective view of two tank shells positionally aligned to define a confined cavity therewithin.

The figures show an improved tank clamping mechanism in accordance with the invention.

Referring first to FIGS. 1-5, the mechanism 10 includes first and second tank shells 11 and 13, respectively. The first shell 11 has at least one first flange 15, and preferably several such flanges 15, projecting therefrom. Similarly, the second shell 13 has at least one second flange 17, and preferably several such flanges 17, projecting therefrom. Each second flange 17 is positioned on the shell 13 in general registry with its companion first flange 15. Such flanges 15, 17 are preferably configured to be rigid and securely attached to their respective shells 11, 13.

Figure 2:
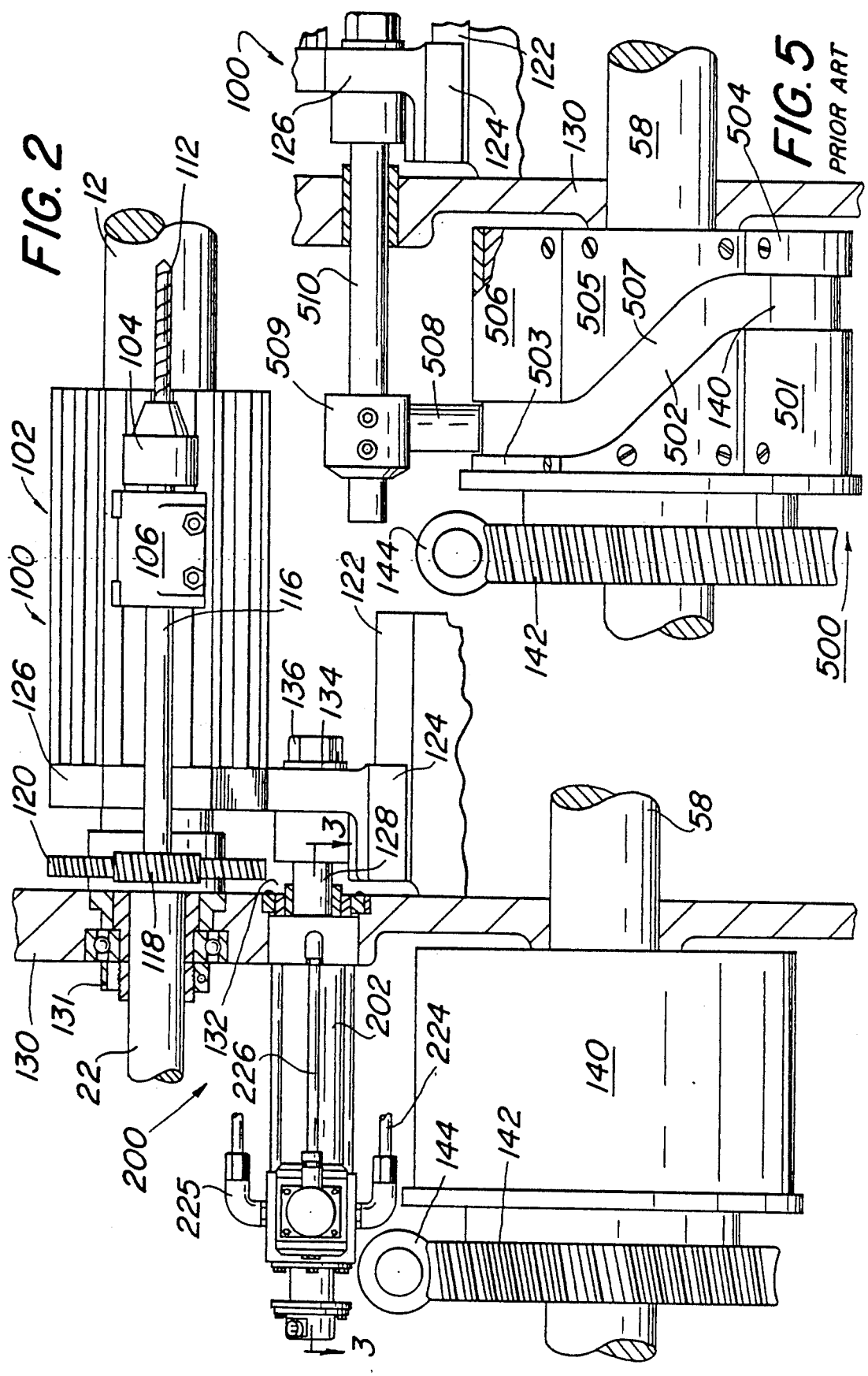
FIG. 2 is an enlarged elevation view of a flange set of the shells taken along the viewing axis 2 of FIG. 1, with parts broken away and other parts in dotted outline.
Figure 3:
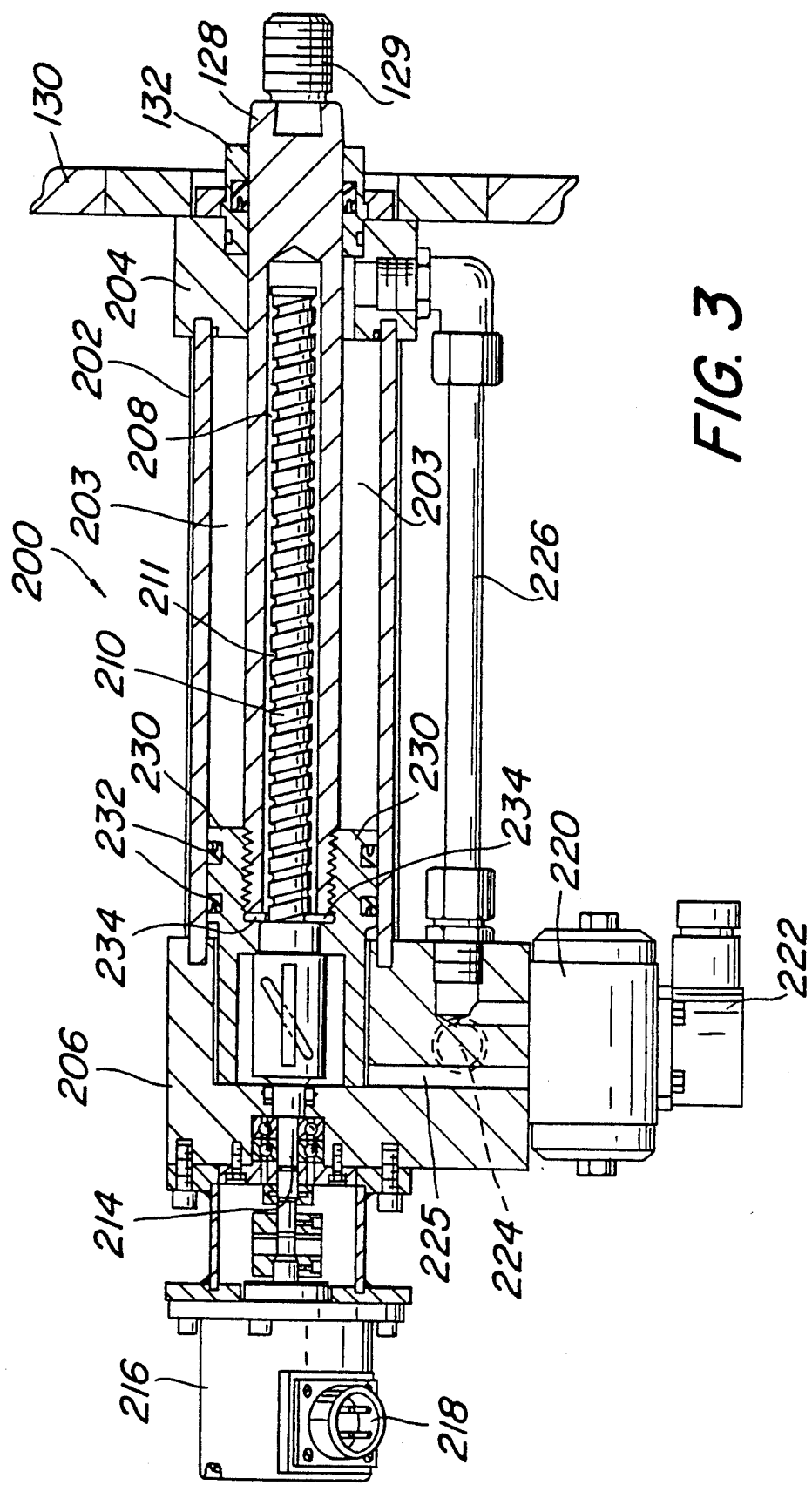
FIG. 3 is a plan view of a first flange taken along the viewing plane 3—3 of FIG. 2 with parts broken away and other parts in dotted outline.

As particularly shown in FIGS. 2 and 3, the first flange 15 is generally defined by a planar lower face 19, a planar upper face 21 and planar side faces 23 and 25, respectively. To the viewer of FIG. 2, the lower face 19 is generally normal to the drawing sheet as would be the viewing axis 20, the upper face 21 is angled slightly downwardly and the side faces 23, 25 are generally parallel to one another.

As shown in FIGS. 3 and 5, the first aperture 27 is generally T-shaped and includes a rectangularly-shaped cross slot 29 for receiving the abutment member 31 with slight clearance and a lateral slot 33 for receiving the threaded shank 35, also with slight clearance. Both the cross slot 29 and the lateral slot 33 extend between the upper face 21 and the lower face 19. The first flange 15 also includes a relief area 37 formed in the front face 39 of the flange 15 to provide a space for portions of the clamping assembly 41 as more fully described below.

Referring next to FIGS. 2 and 4, the second flange 17 includes a planar upper face 43, a planar lower face 45 and planar side faces 47, 49. To the viewer of FIG. 2, the upper face 43 is generally normal to the drawing sheet and parallel to and in contact with the face 19 of the first flange 15 when the tank shells 11, 13 are assembled. The lower face 45 is angled upwardly and the side faces 47, 49 are generally parallel to one another. As shown in FIGS. 3 and 4, the front faces 39 and 53, respectively, of the first flange 15 and the second flange 17 are slightly curved, coterminus and generally parallel to the curved edges 55 of the shells 11, 13.

The second aperture 51 includes a cross slot 57 which is generally rectangular in shape and which extends between the upper face 43 and the lower face 45. A rectangular locating notch 59 is formed to a depth in the upper face 43 and extends between the cross slot 57 and the relief area 61 formed to a depth in the front face 53 of the second flange 17. As shown in FIGS. 2-4, the width and depth of this relief area 61 conform generally to those dimensions of the relief area 37.

As shown in FIGS. 5 and 6, the primary components of the clamping assembly 41 include the abutment member 31, the clamp 63 and adjusting means 65 for adjustably moving the clamp 63 relative to the abutment member 31. In a highly preferred embodiment, the abutment member 31 is embodied as a generally rectangular flat plate having a width and thickness selected to be removably received in the cross slots 29, 57 with slight clearance. The height of the abutment member 31 is no more than and preferably slightly less than the combined height of the cross slots 29 and 57. Such height will avoid interfering with the clamp 63 as it engages the flanges 15, 17.

The clamp 63 includes a top cover 67, a bottom cover 69 and a front panel 71 which extends between and joins the covers 67, 69. Side covers 73, 75 are also joined to the covers 67, 69 and while such covers 73, 75 are not absolutely required, they add strength and rigidity to the structure of the clamp 63. The clamp 63, including the angled positions of the covers 67, 69, and the curvature of the panel 71, is sized and shaped to conform generally to the overall shape defined by the first and second abutted flanges 15, 17 as shown in FIG. 2.

The panel 71 includes a hole 79 formed therethrough, such hole 79 being sized to receive the nose 81 of the plug 83 with slight clearance. The hole 79 is positioned to be in general registry with the locating notch 59 as shown by the the phantom dotted line depiction 85 of the hole 79 in FIG. 2.

The adjusting means 65 includes an elongated threaded shank 35 and a torque member 87. The shank 35 has one end centered on and rigidly attached to the abutment member 31 with the longitudinal axis 89 of the shank 35 preferably generally normal to the planar surface 91 of the member 31. The length of the threaded shank 35 is preferably selected to be sufficiently great to permit the edges 77 of the top cover 67 and the bottom cover 69 to clear the front faces 39, 53 of the flanges 15, 17 as the abutment member 31 is being inserted.

A highly preferred torque member 87 includes a plug 83 and an elongate threaded hole 93 concentrically formed in the plug 83 for engaging the threaded shank 35. A grasping handle 95 is molded or otherwise affixed to the plug 83 for tightening and releasing the clamping assembly 41. In a highly preferred embodiment, the handle 95 has a slot 97 formed in it for receiving a tool. Depending upon the torque required to tighten or release the clamping assembly 41, the above described configuration permits use of a torque bar or the hand. The handle 95 and the plug 83 are preferably cooperatively shaped so that when the clamping assembly 41 is tightened, the shank 35 does not project into the slot 97. A washer 105 is placed between the plug 83 and the clamp 63 to distribute clamping force over a larger area.

Near its inward end, the plug 83 includes a nose 81 of reduced diameter which is received in the hole 79 with slight clearance. The nose 81 and the main body of the plug 83 define a shoulder 99 which bears against the washer 105 and urges it toward the abutment member 31 as the torque member 87 is tightened. A snap ring 101 is received in a snap ring groove for retaining the clamp 63 on the plug 83.

As best seen in FIG. 6, faces 21, 45 of a flange set 103 define an included flange angle A therebetween. Similarly, the top cover 67 and the bottom cover 69 of the clamp 63 define an included clamp angle B therebetween. In a highly preferred embodiment, the flange angle A and the clamp angle B are generally equal to one another and are about 20°. Such angles A, B are preferably selected in view of the maximum tightening torque desired to be exerted upon the torque member 87 and upon the maximum desired excursion of the plug 83 upon the threaded shank 35 to fully engage the flanges 15, 17.

In operation and referring to the FIGURES, the tank shells 11, 13 are positioned so that their flanges 15, 17 are in general registry with one another. In an instance where the shells 11, 13 are connected to one another by a hinge (so as to open and close in "clam shell" fashion), proper location of the shells 11, 13 and flanges 15, 17 with respect to one another will automatically occur. In such instance, only a single set of flanges 15, 17 and a single clamping assembly 41 is required to retain the shells 11, 13 in clamped engagement with one another.

However, the embodiment of FIG. 1 permits total separation of the shells 11, 13 from one another although the incorporation of locating keys or pins may be advisable to help align the shells 11, 13. In addition, such embodiment incorporates a plurality of flanges 15, 17 on each shell 11, 13 for more secure clamping of the shells 11, 13 to one another. This arrangement is preferred where a pressurized medium is confined within the shells 11, 13. The arc length of each flange 15, 17 and the number of flanges 15, 17 are selected in a known way in view of the application for which the shells 11, 13 are intended.

Referring particularly to FIG. 6 and after the shells 11, 13 are positioned as described above, an abutment member 31 is inserted (downward as shown in FIG. 6) into the cross slots 29, 51 of each flange set 103 to a position at which the threaded shank 35 engages the locating notch 59. Such position automatically aligns the clamp 63 with its companion flange set 103. Further, the clamping assembly 41, is then conveniently supported in position by the notch 59 and may temporarily be released without fear of becoming lost.

After placing the clamping assembly 41 as described above, the torque member 87 is rotated to urge the clamp 63 toward the abutment member 31, thereby bringing the clamp 63 to engagement with the flanges 15, 17. The relief areas 37, 61 provide a space for receiving the plug, nose 81 and snap ring 101, thereby permitting the panel 71 to come to contact with the flange faces 39, 53.

When the clamping assembly 41 is positioned as described above and when the torque member 87 is tightened, about one half of the area of the surface of the abutment member 31 will bear against each flange 15, 17. This tends to equalize the stress placed on each flange 15, 17.

From the foregoing description, it will be appreciated that variations of the new clamping mechanism 10 are possible without departing from the fundamental principals thereof. For example, the abutment member 31 may be embodied as a vertically oriented cylinder and the cross slots 29, 57 formed in a tubular shape to receive such cylinder. In fact, an abutment member 31 and related slots 29, 57 of virtually any shape may be used so long as the abutment member 31 is sized to be larger than the lateral slot 33.

Yet another variation involves the formation of a single horizontal cross slot, such slot being partly formed in each flange. A locating notch would be similarly horizontally formed along the plane of intersection of the faces and to a dimension equal to about half the width of the flanges. With such arrangement, the abutment member 31 would be inserted horizontally from one end of the abutted flanges 15, 17.

In yet another variation, the abutment member 31 and shank 35 are placed in the slot 57 and notch 59 of the second flange 17 prior to positioning of the first shell 11 to the second shell 13. The projecting parts of the member 31 and the shank 35 would thereby serve as locating keys for shell assembly. Similarly, the abutment member 31 and the shank 35 could be made an integral part of the second flange 17 and the second shell 13. While this arrangement is entirely functional, a disadvantage is that the entire shell 13 must be replaced in the event of a broken shank 35.

Irrespective of the precise embodiment, the new clamping mechanism 10 is easy and quick to use (whether in assembly or disassembly) and has a number of self-retention features so that parts are less likely to be lost. Also, the new mechanism 10 eliminates the need for using threaded inserts when shells 11, 13 are made by molding. The threads on such inserts often become stripped, necessitating expensive replacement of the entire shell.

While the principles of this invention have been described in connection with specific embodiments, it should be understood clearly that these descriptions are made only by way of example and are not intended to limit the scope of the invention.

What is claimed is:

1. An improved tank clamping mechanism comprising:
 a first tank shell having a first flange protruding therefrom, the first flange including a first aperture configured to restrain an abutment member;
 a second tank shell having a second flange protruding therefrom and positioned in general registry with the first flange, the second flange including a second aperture in general registry with the first aperture and configured to restrain the abutment member;
 a clamping assembly including the abutment member received in the first aperture and the second aperture, the clamping assembly further including a clamp and adjusting means for adjustably moving the clamp relative to the abutment member;

the clamp being configured to engage the first flange and the second flange and urge the flanges toward clamped engagement with one another as the clamp is urged toward the abutment member;

the tank shells thereby being clamped together for confining a pressurized medium therewithin.

2. The clamping mechanism of claim 1 wherein the abutment member is removably received in the first aperture and the second aperture along a first axis of movement and wherein the clamp is movable along a second axis of movement with respect to the abutment member.

3. The clamping mechanism of claim 2 wherein the first axis of movement and the second axis of movement are generally normal to one another and wherein the clamp moves toward the tank shells as the clamp is drawn toward the abutment member.

4. An improved tank clamping mechanism comprising:
- a first tank shell having a plurality of first flanges protruding therefrom and arranged in spaced relationship one to another, each of the first flanges including a generally T-shaped first aperture configured to restrain an abutment member;
- a second tank shell having a plurality of second flanges protruding therefrom, each such second flange being positioned in registry with a companion first flange to define a flange set, each such second flange including a second aperture in registry with the first aperture of the companion first flange and configured to restrain the abutment member;
- a clamping assembly connected to each flange set, each clamping assembly including the abutment member received in the first aperture and the second aperture of the flange set, each clamping assembly further including a clamp and adjusting means for adjustably moving the clamp relative to the abutment member;
- each clamp being configured to engage the first flange and the second flange of a flange set and urge such flanges toward clamped engagement with one another as the clamp is drawn toward the abutment member;

the tank shells thereby being clamped together by a plurality of flange sets for confining a pressurized medium therewithin.

5. The clamping mechanism of claim 4 wherein the clamp and the abutment member are movable along an axis of movement with respect to one another, wherein at least one flange of each flange set includes a generally planar face which is engaged by the clamp as the clamp and the abutment member are drawn toward one another and wherein the face is disposed at an angle with respect to the axis of movement.

6. The clamping mechanism of claim 5 wherein each flange of each flange set includes a generally planar face which is engaged by the clamp as the clamp and the abutment member are drawn toward one another and wherein each face is disposed at an angle with respect to the axis of movement.

7. An improved tank clamping mechanism for use with pressurized swimming pool filter tanks and comprising:
- a first tank shell having a plurality of first flanges protruding therefrom and arranged about the perimeter of the first shell in spaced relationship one to another, each of the first flanges including a generally T-shaped first aperture configured to restrain an abutment member;
- a second tank shell having a plurality of second flanges protruding therefrom, each such second flange being positioned in registry with a companion first flange to define a flange set, each such second flange including a second aperture in registry with the first aperture of the companion first flange and configured to restrain the abutment member, each second aperture including a notch formed therein for positionally locating a clamping assembly;
- a clamping assembly positionally located by the notch and connected to each flange set, each clamping assembly including the abutment member received in the first aperture and the second aperture of the flange set, each clamping assembly further including a clamp and adjusting means for adjustably moving the clamp relative to the abutment member, each adjusting means including a threaded shank attached to the abutment member and a torque member rotatably attached to the threaded shank for tightening and loosening the clamp;
- each clamp being configured to engage the first flange and the second flange of a flange set and urge such flanges toward clamped engagement with one another as the clamp is drawn toward the abutment member by rotation of the torque member;

the tank shells thereby being clamped together by a plurality of flange sets for confining a pressurized liquid therewithin.

8. The clamping mechanism of claim 7 wherein the abutment member is embodied as a generally planar plate perpendicularly attached to the threaded shank and having a surface area, about one-half of such surface area bearing against an interior surface of the first aperture and about one-half of such surface area bearing against an interior surface of the second aperture of each flange set as the torque member is rotated to engage the clamp with the flange set, the abutment member thereby distributing force generally equally between each flange of a flange set.

9. The clamping mechanism of claim 8 wherein the abutment member is removably received in the first aperture and the second aperture along a first axis of movement and wherein the clamp is movable along a second axis of movement with respect to the abutment member.

10. The clamping mechanism of claim 9 wherein the first axis of movement and the second axis of movement are generally normal to one another and wherein the clamp moves toward the tank shells as the clamp is drawn toward the abutment member.

11. The clamping mechanism of claim 10 wherein the clamp has a generally U-shaped cross sectional shape and includes a top cover, a bottom cover and a panel joining the covers and wherein the top cover and the bottom cover diverge from one another.

12. The clamping mechanism of claim 11 wherein each flange of a flange set includes a generally planar face, wherein the faces of each flange set define an included flange angle therebetween, wherein the top cover and the bottom cover define an included clamp angle therebetween and wherein the flange angle and the clamp angle are generally equal to one another.

* * * * *